INVENTOR
WALTER V. SLOMINSKI

Aug. 8, 1967  W. V. SLOMINSKI  3,334,887
SPRING ASSEMBLY WITH INDEPENDENT COIL SPRING UNIT
Filed Oct. 22, 1965  2 Sheets-Sheet 2
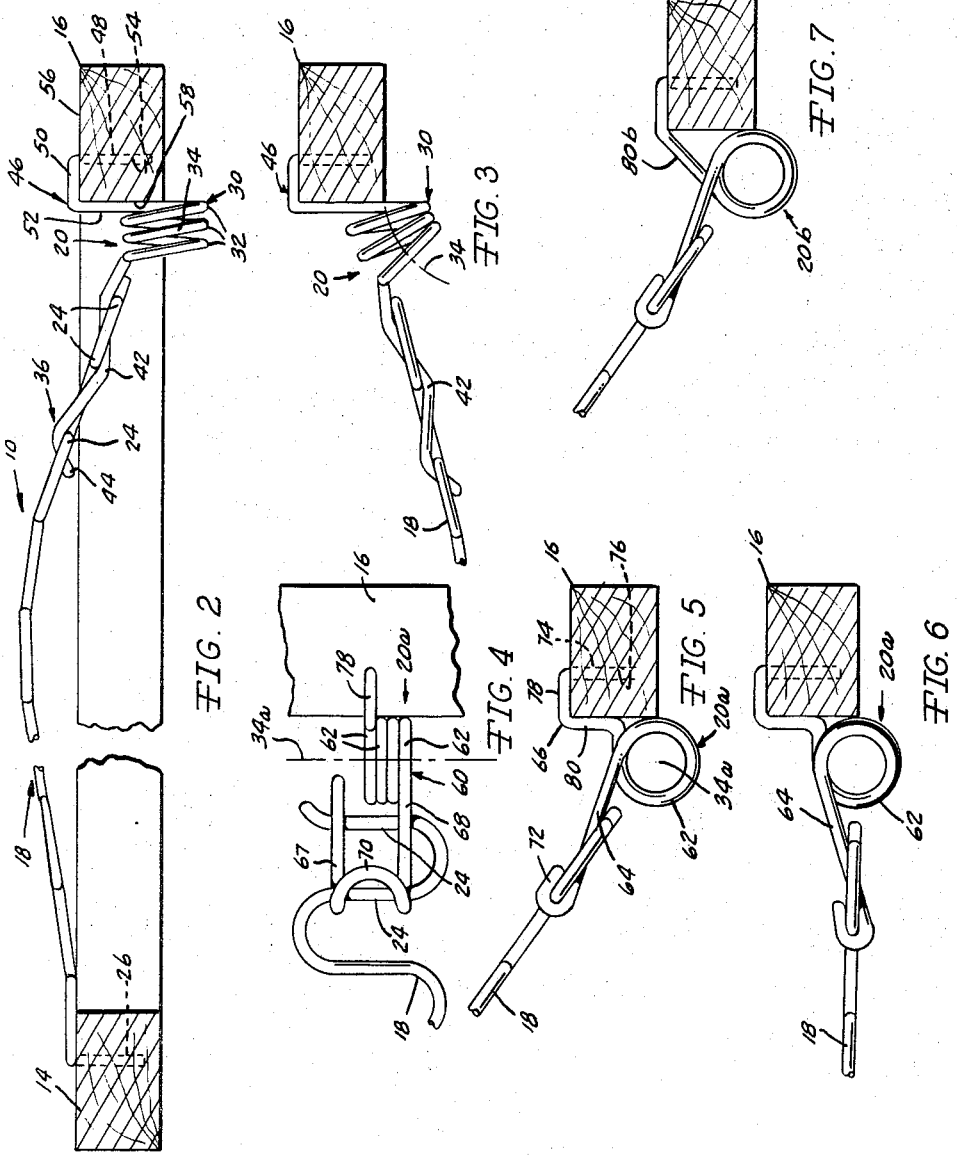
INVENTOR
WALTER V. SLOMINSKI
BY Olsen and Stephenson
ATTORNEY

United States Patent Office 3,334,887
Patented Aug. 8, 1967

3,334,887
SPRING ASSEMBLY WITH INDEPENDENT COIL SPRING UNIT
Walter V. Slominski, Lexington, Ky., assignor to Hoover Ball and Bearing Company, Saline, Mich., a corporation of Michigan
Filed Oct. 22, 1965, Ser. No. 501,549
8 Claims. (Cl. 267—110)

This invention relates generally to seating structures and more particularly to an improved assembly for seating structures which incorporates an independent coil spring unit.

It is desirable, for seating comfort purposes to include a coil spring in many seating springs utilizing the well known sinuous, formed, or straight wire main spring strips. However, when the coil spring is formed as an integral part of a straight, formed wire, or sinuous wire spring strip, design flexibility in the seating structure is greatly reduced because of variation in the overall lengths of the springs involved. Furthermore, such a situation results in many low volume production springs, causing costly machine tooling and change-over times in manufacture, which in turn results in a high cost of the springs. In cases where separate conventional coil springs are combined with straight formed wire or sinuous wire springs, special brackets or clips must be incorporated in the assembly in order to attach the coil springs to the spring strip and the supporting frame rails. Such clips and brackets also contribute to a high overall cost of both manufacture and installation. Furthermore, in spring assemblies of this type, the coil spring reacts only in tension on a straight line extending through the axis of the spring, the coil spring resists the applied load only in tension, and not in bending, and the coil spring is incapable of inducing stability to the flatness of the spring strip. It is an object of this invention, therefore, to provide a coil spring unit which can be manufactured in high volume on a single machine, can be attached directly to a spring strip of straight, formed, or sinuous wire, is attachable directly to a supporting frame rail which can be of metal, plastic, or wood, can be attached directly to either or both ends of a spring strip, is capable of compensating for variations in total spring length requirements, and which provides for a depth and buoyancy of deflection in a seating structure which is not limited by bucketing, thereby improving the comfort of the seating structure.

A further object of this invention is to provide an improved seat spring assembly which includes an independent coil spring unit usable with a spring strip of any length, thereby enabling a greater degree of standardization in the manufacture of seat springs, resulting in lower costs.

Still a further object of this invention is to provide independent coil spring units which can be assembled with spring strips so that the axis of the coil extends either transversely or longitudinally of the length of the strip thereby providing for flexibility in the manufacture of seating structures to accomplish a desired seating characteristic.

Further objects, features and advantages of this invention will become apparent from a consideration of the following description, the appended claims, and the accompanying drawing in which:

FIGURE 2 is a transverse sectional view of a seating structure frame having a spring assembly of this invention mounted thereon, looking substantially along the line 2—2 in FIG. 1, and showing the spring assembly in an undeflected position;

FIGURE 3 is a fragmentary sectional view, illustrated similarly to FIG. 2, showing one end of the spring assembly in a deflected position;

FIGURE 4 is a fragmentary plan view illustrated similarly to FIG. 1, showing a spring assembly which includes a modified form of the coil spring unit of this invention;

FIGURE 5 is a transverse sectional view, illustrated similarly to FIG. 2, of the structure shown in FIG. 4, showing the spring assembly in an undeflected position;

FIGURE 6 is a transverse sectional view, illustrated similarly to FIG. 5, showing the modified form of the spring assembly of this invention in a deflected position; and FIGURE 7 is a transverse sectional view, illustrated similarly to FIG. 5, showing still another modified form of the spring assembly of this invention.

Figure 1:
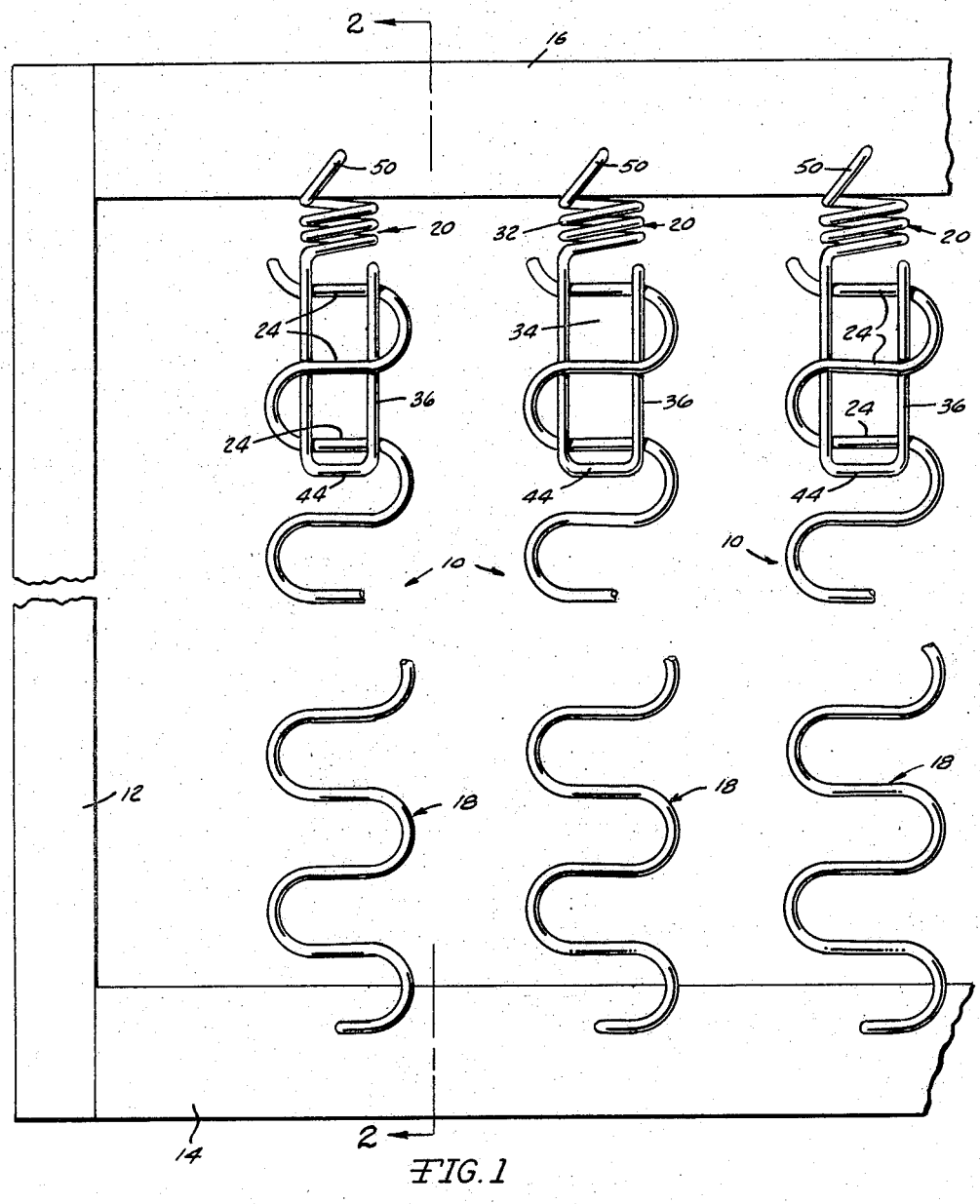
FIGURE 1 is a fragmentary foreshortened plan view of a seating structure frame having spring assemblies of this invention mounted thereon.

With reference to the drawing, the spring assembly of this invention, indicated generally at 10, is illustrated in FIGS. 1 and 2 mounted on a seating structure frame 12 which includes a pair of spaced rails 14 and 16, hereinafter referred to as the front and rear rails, respectively. In order to form a spring deck or surface on the frame 12, for supporting the seating structure padding and upholstery, a plurality of spring assemblies 10 are mounted as shown in FIG. 1 so that they extend between the rails 14 and 16, the number of assemblies 10 used in each case depending on the seating requirement and the size of the seating structure, three being illustrated in FIG. 1.

In the illustrated embodiment of the invention, the spring assembly 10 consists of a main spring 18, formed of sinuous wire and hereinafter sometimes referred to as a spring strip, and a coil spring unit 20 which is coupled to the rear end of the main spring 18. It is to be understood, however, that it is within the scope of this invention to couple the coil spring unit 20 to the front end of the main spring 18, and also to couple a pair of coil spring units 20 to opposite ends of the main spring 18.

The main spring 18 can be of the illustrated sinuous wire, or it can be formed of straight wire, or the well known formed wire, so long as it is shaped adjacent the end which is to be attached to the coil spring unit 20 so that it has a plurality of transversely extending torsion bars 24 spaced lengthwise of the spring 18. Also, in the illustrated embodiment of the assembly 10, the main spring 18 is shown mounted on the front rail 14 by means of a prong 26 formed on the front end of the main spring 18 and extended downwardly through the top side of the frame rail 14, although it is to be understood that the spring 18 can be attached to rail 14 in any suitable manner.

As best appears in FIG. 2, the coil spring unit 20 is of one-piece construction having a center or intermediate section 30 shaped to form a plurality of spaced coils 32 having an axis 34 which extends horizontally in the direction in which the main spring 18 extends. The coil spring unit 30 also includes one end section 36 formed by return bending the wire upon itself so as to form two substantially parallel legs 38 which are spaced apart a distance substantially equal to the length of a torsion bar 24, and a bight 40 which extends between the legs 38 and forms the terminal end of the end section 36. As shown in FIG. 2, the legs 38 are bent to a substantially V-shape, indicated at 42, terminating at the bight 40 in a hook 44 which is extended downwardly. The end section 38 is formed integral with one of the endmost coils 32 and is joined to that endmost coil 32 at the top side of the coil. The spring unit 30 includes another end section 46 which consists of a downwardly extending prong 48, a wire portion 50 which is substantially horizontal, and a downwardly extending wire portion 52 which is formed integral with the other endmost coil 32 and is joined thereto at the lower end of the coil as shown in FIG. 2.

In the assembly of the coil spring unit 20 with the main spring 18, the end section 36 of the coil spring unit 20 is coupled to the rear end of the main spring 18 as shown in FIGS. 1 and 2. This coupling is accomplished by positioning the legs 38 which are bent to the V-shape indicated at 42 in FIG. 2 so that the apex of the V is engaged with the underside of the next to the endmost torsion bar 24. The terminal ends of the legs in the V engage the top sides of the torsion bars 24 on opposite sides of the next to the endmost torsion bar 24, so that in effect the hook 44 is hooked over the second to the endmost torsion bar 24. When the main spring 18 and the coil spring unit 20 are thus coupled, they are firmly connected so that the coil spring unit end section 36 will move with the torsion bars 24 during deflection of the main spring 18.

In the assembly of a spring unit 10 with the frame 12, the front end of the main spring 18 is mounted on the front rail 14 as illustrated, and the spring assembly 10 is stressed to locate the prong 48 on the spring unit 20 in a downwardly extending opening 54 formed in the frame rail 16. Prong 48 is inserted in the opening 54 to a position in which the wire portion 50 engages the top side 56 of the rail 16 and wire section 52 engages the inner side 58 of the frame rail 16. As shown in FIG. 1, the wire portion 50 is at an angle to the axis 34 of spring coils 32 so as to substantially center prong 50 with the axis 34 and thereby stabilize the unit 20 on the rail 16. When the spring unit 20 is thus mounted, its axis 34 is substantially horizontal when the spring assembly 10 is not under load so that it is in the undeflected position shown in FIG. 2. In the illustrated embodiment of the invention, the spring assembly 10 is formed with a crown, but it is to be understood that the assembly 10 can be formed to include a substantially flat main spring 18.

In the use of the spring assembly 10, when the main spring 18 is loaded, so that the torsion bars 24 are moved downwardly as shown in FIG. 3, the loosely wound coils 32 are opened further at their upper ends and closed at their lower ends, as shown in FIG. 3, so that the coil spring axis 34 assumes the downwardly curved shape shown in FIG. 3. This loose winding of the coils 32, so that they are spaced apart, as shown in FIG. 2, when not under load, provides for an even distribution of stresses during closing and opening of the coil. Furthermore, the unit 20 is more or less bent when under load, as shown in FIG. 3, with the resistance which the unit 20 provides to bending acting to stabilize the flatness of the main spring 18 and prevent bucketing. The coil spring unit 20 thus cooperates with the main spring 18 to provide a depth and buoyancy of deflection to the spring assembly 10 which is not limited by bucketing of the assembly.

A modified form of the spring assembly of this invention, indicated generally at 10a, is illustrated in FIG. 4 as including a main spring 18 and a coil spring unit 20a which is formed from a single piece of wire. The coil spring unit 20a is likewise of one-piece construction including an intermediate or center section 60 in the form of a plurality of coils 62, a generally U-shape end section 64 which is coupled to the rear end of the main spring 18, and an end section 66 which is pronged into the frame rail 16. The coils 62 have an axis 34a which extends transversely of the length of the main spring 18 and substantially parallel to the main spring torsion bars 24, as contrasted to the axis 34 of the coils 32 which extends perpendicular to the torsion bars 24.

The end section 64 includes a pair of parallel legs 67 and 68 and a bight 70 which is bent as shown in FIG. 5 to form a hook 72 which is hooked over the next to the endmost torsion bar 24 of the main spring 18. The legs 67 and 68 extend across the top side of the endmost torsion bar 24, the leg 68 being joined to one of the endmost coils 62 at the top side thereof.

The end section 66 is of inverted U-shape, terminating in a downwardly extending prong 74 which is extended downwardly into an opening 76 in the frame rail 16. From the prong 74, the end section 66 is formed with a wire portion 78 which lies flat against the top side 56 of the rail 16 and downwardly extending wire portion 80 which lies flat against the front side 58 of the frame rail 16. When the unit 20a is mounted on the rail 16, the coils 62 engage the front side 58 of the frame rail 16 to stabilize the unit 20a.

In the use of the spring assembly 10a, as it is loaded it deflects downwardly as shown in FIG. 6. The end section 64 of the spring unit 20a moves downwardly with the torsion bars 24 to which it is coupled, resulting in a tightening of the coil spring formed by the coils 62. This tightening and the resistance of the unit 20a to bending, provides stability to the flatness of the main spring 18 and prevents bucketing.

In the spring unit 20a, the wire portion 80 engages the inner side 58 of the frame rail 16 for stability purposes. However, it is to be understood that inasmuch as the coils 62 engage the same surface, this is not an absolute requirement, as shown in FIG. 7 in connection with another modified coil spring unit 20b. The unit 20b is identical in all respects, other than the disposition of the wire portion 80b at an angle. Further description of unit 20a is therefore believed to be unnecessary.

From the above description it is seen that this invention provides spring assemblies 10 and 10a, each of which includes an independent coil spring unit 20 and 20a, respectively. The spring strips 18 can be formed in the usual machinery to the desired length, quickly assembled with a coil spring unit 20, 20a or 20b and attached directly to the frame 12. Since each coil spring unit has a portion which extends into one side of a rail on which it is mounted and a portion engaged with an adjacent side of the rail, each coil spring unit is readily firmly mounted directly on a rail irrespective of whether the rail is formed of wood, metal, or plastic. The units 20, 20a, or 20b can in turn be manufactured in volume on machinery tooled for that purpose. When the coil spring units 20, and 20a of this invention are incorporated in a spring assembly improved seating is obtained.

It will be understood that the spring assembly with independent coil spring unit which is herein disclosed and described is presented for purposes of explanation and illustration and is not intended to indicate limits of the invention, the scope of which is defined by the following claims.

What is claimed is:

1. In a seating structure which includes a pair of horizontally spaced frame rails each of which has a top surface and an inner side surface, a spring assembly comprising a main wire spring member mounted at one end on one of said rails and provided at the other end with a plurality of transversely extending torsion bars joined by connecting wire portions, a one-piece coil spring unit having a pair of end sections and a center section consisting of a plurality of spaced coils having an axis extending lengthwise of said main spring member, one end section of said unit being coupled to said torsion bars for downward movement therewith on loading of said main spring member, said one end section being joined to one of the endmost one of said coils at the top side thereof, said opposite end section being secured to the other one of said frame rails so that said opposite end section is fixedly positioned against the top and inner side surfaces of said other frame rail, said opposite end section being joined to the other endmost one of said coils so that on downward movement of said one end section with said torsion bars the axis of said coils is moved to a downwardly curved position extending from said other frame rail toward said one frame rail.

2. In a seating structure which includes a pair of horizontally spaced frame rails each of which has a top surface and an inner side surface, a spring assembly comprising a main wire spring member mounted at one end on one of said rails and provided at the other end with a plurality of transversely extending torsion bars joined by connecting wire portions, a one-piece coil spring unit having a pair of end sections and a center section consisting of a plurality of coils having an axis extending transversely of said main spring member, one end section of said unit being coupled to said torsion bars for downward movement therewith on loading of said main spring member, said one end section being joined to one of the endmost one of said coils at the top side thereof, said opposite end section being secured to the other one of said frame rails so that said opposite end section is fixedly positioned against the top surface of said other frame rail, said opposite end section being joined to the other endmost one of said coils so that on downward movement of said one section with said torsion bars said coils are tightened.

3. The structure according to claim 2 wherein said coils are positioned so that the sides thereof are in engagement with the inner side surface of said other frame rail.

4. The structure according to claim 2 wheretin said opposite end section of said coil spring unit has a portion thereof engaged with the inner side surface of said other frame rail.

5. The structure according to claim 3 wherein said opposite end section of said coil spring unit has a portion thereof extending from said top surface of said other frame rail downwardly to the top side of said other endmost one of said coils.

6. A spring assembly for seating structures comprising a wire spring strip having a pair of ends and provided at one of said ends with a plurality of transversely extending torsion bars joined by connecting wire portions, a one-piece coil spring unit having a pair of end sections and a center section consisting of a plurality of spaced coils having an axis extending lengthwise of said spring strip, one end section of said unit having a pair of substantially parallel legs coupled to said torsion bars and hooked to one of said torsion bars for movement therewith on loading of said spring strip, said one end section being joined to one of the endmost one of said coils and including a portion extending upwardly therefrom thence horizontally in a direction angularly related to said axis and finally downwardly in the form of a prong.

7. A spring assembly for a supporting seat structure having spaced frame rails wherein said spring assembly is to span the distance between said rails and support loads applied to one side of said assembly tending to move said spring assembly in a direction into the space between said rails, said spring assembly comprising a main wire spring having a pair of ends one of which is adapted to be connected to one of said rails and the other one of which is formed with a plurality of transversely extending torsion bars, a coil spring unit formed with a plurality of coils and having an end section rigidly attached to the other rail to preclude pivoting of said unit relative to said other rail and so as to locate said coils in close proximity to said other rail, said coil spring unit having a portion thereof spaced from said end section coupled directly to said main spring torsion bars so that said coils will resist said loads on said spring assembly, said unit being coupled to said torsion bars by extending said portion between the endmost and the next to the endmost ones of said torsion bars so that said unit is engaged with said endmost torsion bar on the side thereof corresponding to said one side of said assembly and with the opposite side of said next to the endmost torsion bar so that a pre-arching of said main spring is not necessary to maintain said couple and so that deflection of said main spring in said direction in response to said loads will cause said endmost and said next to the endmost torsion bars to apply a moment to said coil spring unit.

8. A spring assembly according to claim 7 wherein said rails are spaced apart in a horizontal direction so that said main wire spring extends substantially horizontally and wherein said unit is engaged with the top side of said endmost torsion bar and with the bottom side of said next to the endmost torsion bar.

References Cited
UNITED STATES PATENTS

| | | | |
|---|---|---|---|
| Re. 22,461 | 3/1944 | Kronheim | 267—1 |
| 2,851,088 | 9/1958 | Pietraszka | 267—102 |
| 2,973,805 | 3/1961 | Rowan | 267—1 |
| 3,185,467 | 5/1965 | Caughey | 267—107 |
| 3,210,064 | 10/1965 | Crosby | 267—112 |
| 3,292,921 | 12/1966 | Winkler et al. | 267—110 |

ARTHUR L. LA POINT, *Primary Examiner.*

EUGENE G. BOTZ, *Examiner.*

R. M. WOHLFARTH, *Assistant Examiner.*